J.L. Jackson.
Fan.
Nº 63,389.   Patented Apr. 2, 1867.
Fig: 1.
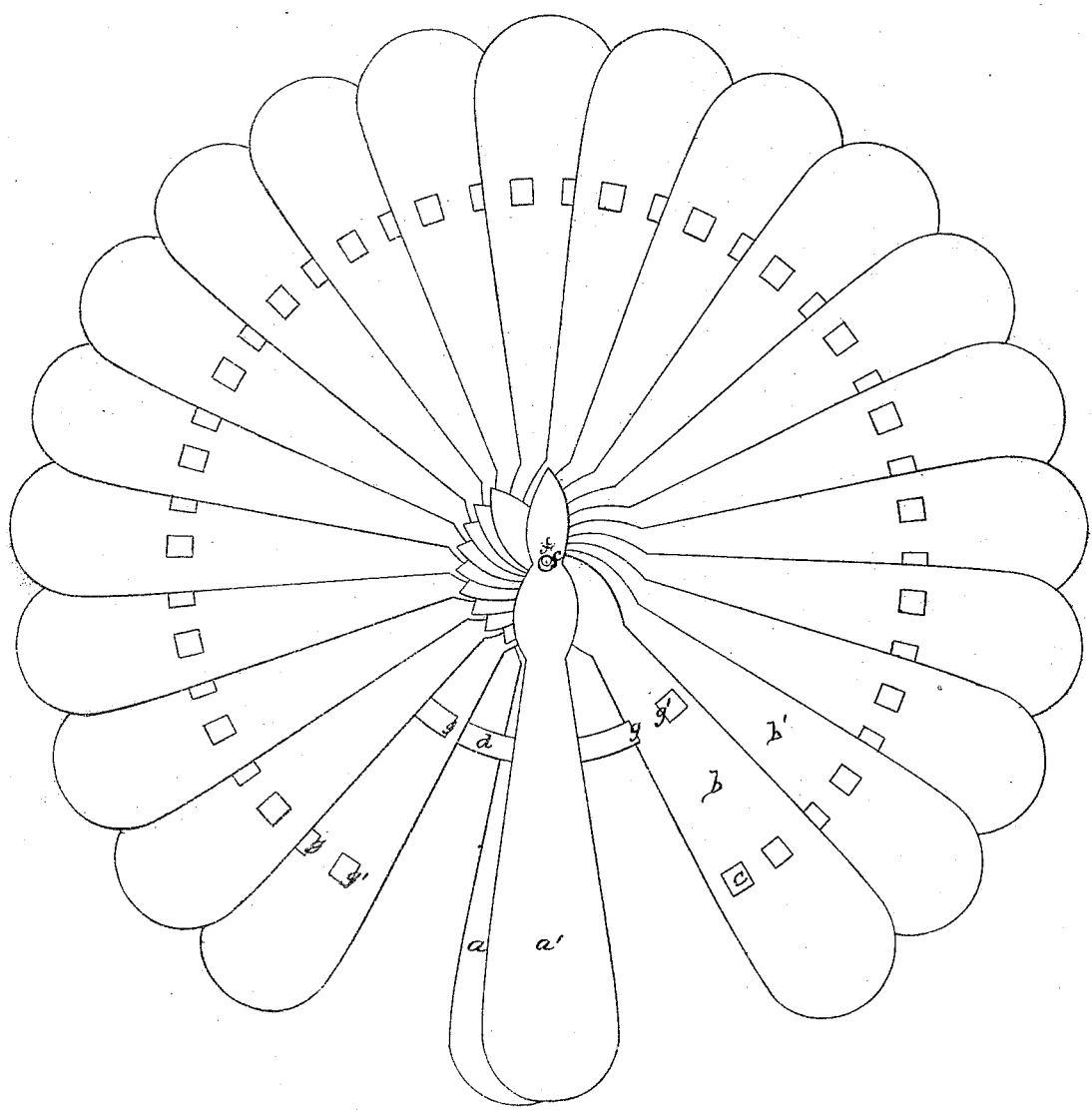
Fig: 2.
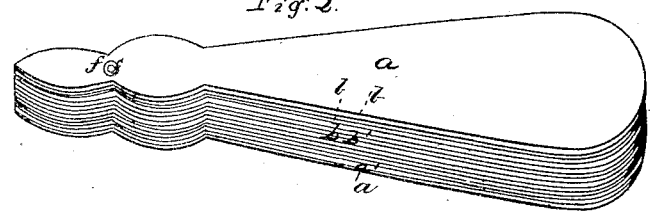
Witnesses
Chas. C. Howell
E. H. Williams
Inventor.
J.L. Jackson.

United States Patent Office.

JAMES L. JACKSON, OF NEW YORK, N. Y., ASSIGNOR TO DAVID N. ROPES, OF ORANGE, NEW JERSEY.

Letters Patent No. 63,389, dated April 2, 1867.

IMPROVEMENT IN FANS.

*The Schedule referred to in these Letters Patent and making part of the same.*

TO ALL WHOM IT MAY CONCERN:

Be it known that I, JAMES L. JACKSON, of the city, State, and county of New York, have invented a new and improved Pocket Fan; and I do hereby declare that the following is a full and exact description thereof, reference being had to the accompanying drawings, and to the letters of reference marked thereon.

Figure 1 is a full view of the fan when open.

Figure 2 is an isometrical view of fan when closed.

$a\ a'$ are the handles. $b\ b'$, &c., are the leaves. $d$ is the cord connecting the leaves to the handles. $c$ is the connecting cord, to keep the leaves in place. (Cord, tape, or ribbon may be used for the purpose.) $f$ is the pivot on which the leaves and handle turn. $g\ g'$ are the slots in the leaves of the fan, to receive the cords $c$ and $d$.

The nature of my invention consists in providing a neat and compact fan, that may be folded up into a small compass and carried in the pocket without being cumbersome, the handles of the fan being made the same size and form of the leaves that constitute the fan.

Construction and Operation.

To enable others skilled in the art to make and use my invention, I will proceed to describe its construction and operation.

The leaves of the fan are cut out to the desired shape, of wood, or any other known material that has the required substance to keep its place. The handles $a\ a'$ are then made of wood, or any other suitable material, to a shape corresponding with the leaves $b\ b'$, and to a proper thickness to keep the leaves of the fan in their places and afford them the required protection when closed and carried in the pocket. The leaves and handles of the fan having been made, the leaves $b\ b'$, &c., are put together; then the handles $a\ a'$ are put on outside of the before-mentioned leaves, and the whole are riveted together, as shown at $f$, in a manner so that the rivet $f$ forms a pivot for the leaves $b\ b'$, &c., and the handles $a\ a'$ to turn on. The fan now put together, there are holes or slots $g\ g'$, &c., punched through the leaves to receive the connecting cords $c$ and $d$. The connecting cords $c$ and $d$ are then put through the slots; the leaves of the fan are then spaced off even, the handles adjusted to their places, and the cords are then made fast by means of glue or in any other known manner, the short cord $d$ having been put nearer the centre or pivot $f$, and a space left between the leaves $b\ b'$, &c., and the handle $a\ a'$ of the fan, to enable the user to have free access to the handle. The fan is now ready for use.

Claim.

The fan, with its outer leaves $a\ a'$ connected to the adjacent leaves by straps $d$, and the remaining leaves retained by straps $g\ g'$, whereby the outer leaves protect and enclose all the leaves when closed, and form a handle for the fan when extended, substantially as represented and described.

J. L. JACKSON.

Witnesses:
CHAS. MORRILL,
E. H. WILLIAMS.